L. SWANK.
TWISTER HEAD.
APPLICATION FILED JAN. 23, 1919.

1,316,000.

Patented Sept. 16, 1919.

Witness
Frank A. Fable

Inventor
Lafe Swank,
Hood & Ashley.
Attorneys

UNITED STATES PATENT OFFICE.

LAFE SWANK, OF ANDERSON, INDIANA, ASSIGNOR TO DWIGGINS WIRE FENCE COMPANY, OF ANDERSON, INDIANA, A CORPORATION OF INDIANA.

TWISTER-HEAD.

1,316,000.   Specification of Letters Patent.   Patented Sept. 16, 1919.

Application filed January 23, 1919.   Serial No. 272,647.

*To all whom it may concern:*

Be it known that I, LAFE SWANK, a citizen of the United States, residing at Anderson, in the county of Madison and State of Indiana, have invented a new and useful Twister-Head, of which the following is a specification.

The object of my invention is to produce a twister-head, for use in twisting the ends of lateral wires to longitudinal, or running, wires of fence fabric, of such character that splices in the running wire may pass through the head without difficulty, the head being, thereby, of such character that it may be rotated continuously although only brought intermittently into twisting action.

Figure 1:
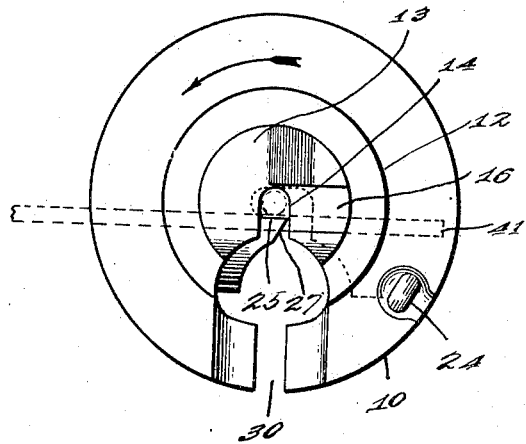
Figure 3:
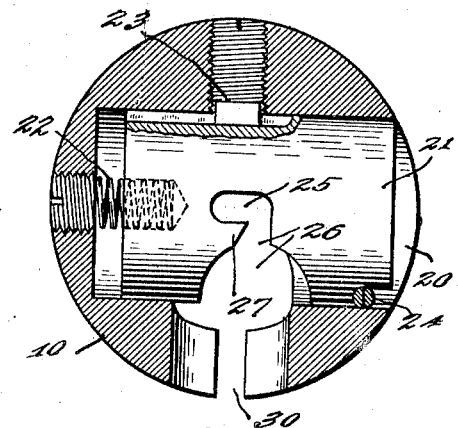
Figure 2:
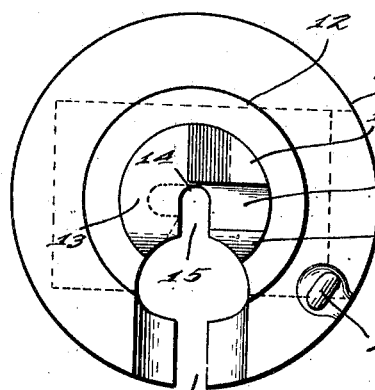
Figure 4:
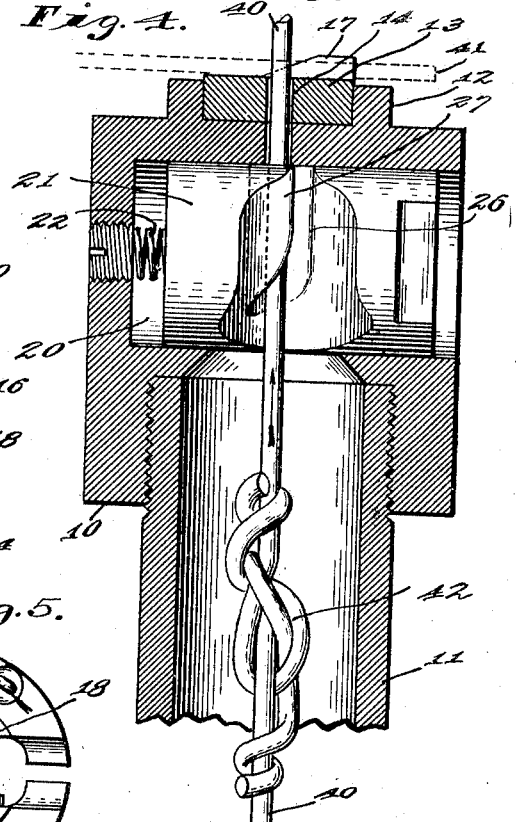

The accompanying drawings illustrate my invention. Figure 1 is a plan of my improved head with the retainer in normal position; Fig. 2 a plan with the retainer displaced to permit passage of a splice in the running wire; Fig. 3 a lateral section, with the retainer in normal position; Fig. 4 an axial section with the retainer in normal position and a spliced running wire in place; and Fig. 5 a plan similar to Fig. 1 but on a smaller scale and showing a running wire, and a partially twisted lateral wire, in place.

In the drawings, 10 indicates the main body of my twister head carried by a tubular rotary shank 11. Body 10 is provided, at its free end, with a ring 12 which is coaxial with shank 11. Ring 12 forms a seat for a twister plate 13, having an axial bore 14, a radial slot 15 enlarged at its outer end, and a radial groove 16 flanked on its forward side by cam-rib 17 and on its rear side by twister rib 18.

Body 10 is provided with a transverse cavity 20 in which is slidably mounted the locking member 21 normally urged to locking position by a spring 22. Member 21 is prevented from turning by pin 23 and is limited in its movement by pin 24. Extended through member 21 is a slot 25 which is in alinement with the axis of rotation of body 10, and communicating with one end of this slot is a slot 26, widened at its outer end so as to be capable of registering with slot 15, and so connected with slot 25 as to form the locking finger 27 adapted to bridge slot 15.

Slot 26, at its lower end, (see Fig. 4) is widened, or eased out, to register with the bore of shank 10 and mating with the widened part of slot 15.

Body 10 may be longitudinally slotted at 30 if desired, and the enlarged outer end of slot 15 is continued axially through body 10 into shank 11.

Figure 5:
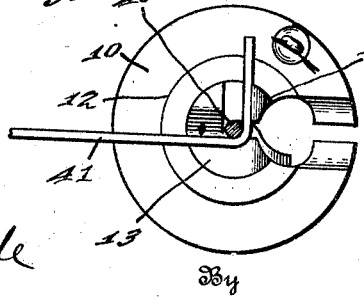

The operation is as follows: The locking member lies normally in the position shown in Fig. 3, and the running wire 40 to be incorporated as one edge of a fence fabric, is threaded through shank 11, slot 25 and bore 14, and the twister head rotated in the direction indicated by the arrow in Fig. 5. A stay-wire 41 having been laid across wire 40, the rotating twister head is shifted axially so that the end of wire 41 will be engaged by twister-rib 18, as shown in Fig. 5, and twisted around wire 40.

Under normal conditions, finger 27 locks wire 40 in slot 25 and bore 14, but in course of time, it becomes necessary to splice wire 40 and the splice 42 arrives at the twister-head. As the splice reaches and enters the widened outer end of slot 26, it pushes the locking member 21 to one side, so as to withdraw finger 27. Thereupon, wire 40 will be withdrawn laterally from slot 25 and bore 14 as splice 42 passes through the enlarged portions of slots 15 and 26. As soon as the splice has passed, however, wire 40 springs back into normal position and the locking member returns so as to lock the wire in the axis of the rotating head.

I claim as my invention:

A twister head comprising a main body bored axially and laterally slotted to permit the passage of a spliced wire, a locking member movable transversely of the body bore and provided with a locking slot to lock the wire in the body bore, said locking slot being laterally slotted to permit lateral displacement of the wire during passage of a splice.

In witness whereof, I have hereunto set my hand at Anderson, Indiana, this 18th day of January, A. D. one thousand nine hundred and nineteen.

LAFE SWANK.